United States Patent Office 3,156,066
Patented Nov. 10, 1964

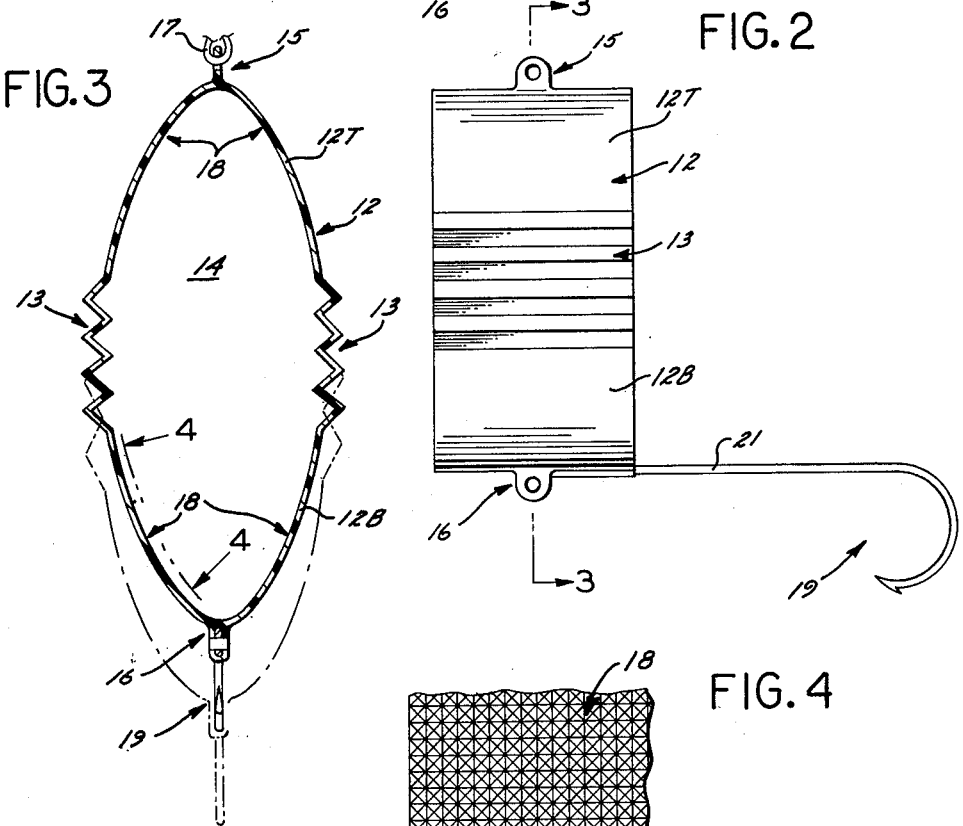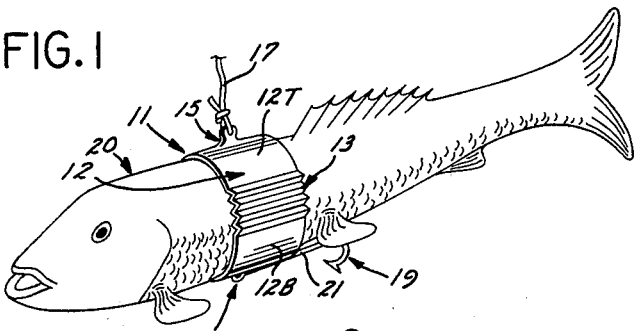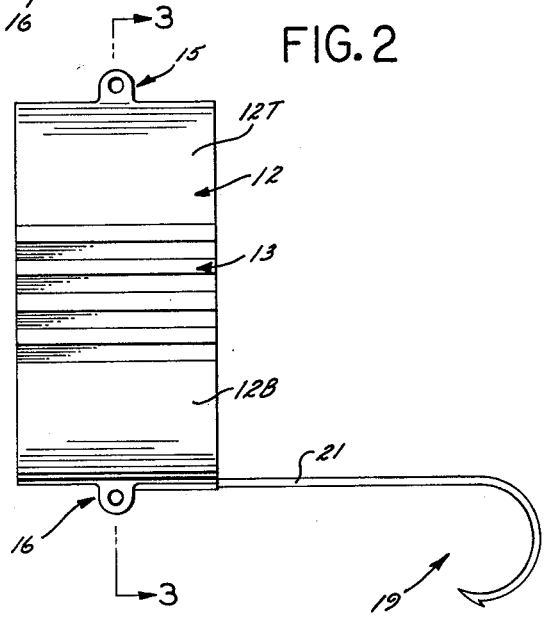

3,156,066
LIVE BAIT HOLDER
George E. Munyer, Inglewood, Calif.
(4093 Rosecrans Ave., Hawthorne, Calif.)
Filed Mar. 4, 1963, Ser. No. 262,491
6 Claims. (Cl. 43—44.4)

Generally speaking, the present invention relates to the fishing art and, more particularly, to a device for effectively holding a bait for fishing purposes, said bait usually comprising a live fish body such as a herring, minnow, or the like, although not so limited, which comprises a very effective type of bait since the fact that the bait is a live fish and, therefore, moves in a completely natural manner in the water, provides a maximum degree of attractiveness to large fish in the vicinity. However, it should also be noted that the device of the present invention may be employed for holding bait, such as a dead fish body, or other types of bait, either alive or dead. However, one primary object of the present invention is to provide a novel bait holder for holding bait comprising a live fish body.

It should be noted that the novel bait holder of the present invention holds the live fish body, comprising the bait, in a very positive manner and without damaging same so that the live bait fish will remain alive during the entire fishing operation, and also in a manner such as to facilitate any normal type of fishing operation such as casting, trolling, or the like, where the casting or trolling operation normally tends to disengage the fish body from the fish hook upon which it is customarily engaged in accordance with prior art practice. In other words, the novel bait holder of the present invention, not only keeps the live bait fish alive, but also holds it so firmly and effectively as to make it possible to readily cast same or to draw same through a body of water without any likelihood of disengaging the live bait fish from the bait holder.

Furthermore, it should be noted that, in one preferred form of the present invention, the bait holder closely simulates in appearance the corresponding portion of the body of the live bait fish so as to minimize the possibility of any nearby larger fish seeing the bait holder (or the fish hook which it carries very closely adjacent to the live bait fish body), thus maximizing the likelihood of said large fish taking the bait and hook.

With the above points in mind, it is an object of the present invention to provide a novel bait holder adapted to resiliently encircle and hold a portion (usually a substantially middle portion) of the exterior surface of a live bait fish (or other equivalent bait) in a manner which will positively engage and hold the same during a fishing operation and yet in a manner which will prevent damage thereto.

It is a further object of the present invention to provide a novel bait holder of the type referred to hereinbefore wherein it is not necessary for a live bait fish to be placed upon a fish hook in the prior art manner, which results in early death of the live bait fish and the consequent loss of effectiveness thereof as bait.

It is a further object of the present invention to provide a novel bait holder which closely simulates in appearance a corresponding portion of a live bait fish and which carries fishing hook means in a position very close to the body of the live bait fish whereby to effectively camouflage same and to maximize the effectiveness of the bait holder, live bait fish, and fishing hook means.

It is a further object of the present invention to provide a novel bait holder of the type referred to hereinbefore which is of relatively simple, inexpensive, easy-to-manufacture, easy-to-mount and easy-to-dismount construction, such as to facilitate widespread usage thereof for the purposes set forth herein.

It is a further object of the present inventon to provide a bait holder (and fishing hook means) embodying any or all of the various generic and/or specific aspects thereof briefly mentioned above.

Further objects are implicit in the detailed description which follows hereinafter (which is to be construed as exemplary of the invention but not specifically limiting it) and said objects will be apparent to persons skilled in the art after a careful study of the detailed description which follows hereinafter.

For the purpose of clarifying the nature of the present invention, one exemplary embodiment is illustrated in the hereinbelow-described figures of the accompanying single drawing sheet.

FIG. 1 is a perspective view of one exemplary embodiment of the invention in mounted relationship with respect to a live bait fish and an end portion of a fishing line leader (or fishing line) which is shown fragmentarily.

FIG. 2 is a larger scale side elevational view of the bait holder means of FIG. 1 without the fishing line or fishing line leader portion and without the live bait fish.

FIG. 3 is a cross-sectional view taken in the direction of the arrows 3—3 of FIG. 2.

FIG. 4 is a fragmentary enlarged elevational view, taken in the direction of the arrows 4—4 of FIG. 3, and clearly illustrates a portion of the frictional engagement means which is adapted to firmly frictionally engage corresponding exterior surface portions of the middle part of the live bait fish for firmly holding same.

FIG. 5 is an even further enlarged view comprising a fragmentary sectional view, taken in the direction of the arrows 5—5 of FIG. 4, and illustrates the details of one specific type of said frictional engagement means comprising knurling.

Generally speaking, the bait holder of the present invention is designated in one exemplary form by the reference numeral 11 (see FIG. 1) and is shown as comprising a resilient loop or ring means of generally elliptical or oval cross-sectional configuration, as best seen at 12 in FIG. 3, with the effective major axis of the generally elliptically shaped resilient loop or ring means 12 lying in a vertical direction and with the effective minor axis thereof lying in a substantially horizontal direction when positioned in the normal use orientation shown in FIGS. 1–3.

In the particular exemplary embodiment of the invention illustrated, said elliptical or oval resilient loop or ring means 12 comprises vertically spaced oppositely positioned top and bottom portions 12T and 12B joined at the sides by resilient effective spring means, indicated generally at 13, normally adapted to draw said opposed portions 12T and 12B toward each other whereby to effectively reduce the size or effective cross-sectional area of the longitudinal interior aperture means defined within said resilient loop or ring means 12, and indicated by the reference numeral 14 in FIG. 3.

In other words, said resilient effective spring means 13 normally acts to cause the entire resilient loop or ring means 12 to draw itself into a position such as that shown in solid or full lines in FIG. 3.

However, it should be clearly understood that force may be applied to said resilient loop or ring means 12 in a manner such as to effectively expand or enlarge said longitudinal interior aperture means 14, when desired, so that a live bait fish, such as that indicated generally at 20 in FIG. 1, can be inserted into a position generally similar to that shown in FIG. 1, after which the application of force to said resilient loop or ring means 12 can be removed so that said resilient loop or ring means 12 will return to its former smaller position, such as that clearly shown in solid or full lines in FIG. 3, whereby to very firmly and positively engage and hold corresponding exterior surface portions of the live bait fish body 20 in the manner clearly shown in FIG. 1.

One such type of forcible enlargement of the resilient loop or ring means 12 is indicated in phantom at the bottom of FIG. 3, where such enlargement is produced by applying vertical tension to said top and bottom portions 12T and 12B of said resilient loop or ring means 12 so as to effectively stretch and vertically elongate each of said resilient effective spring means 13 whereby to relatively vertically displace said top and bottom portions 12T and 12B into the relationship shown with respect to 12T in solid or full lines and with respect to 12B in phantom at the bottom of FIG. 3, thus effectively vertically lengthening and enlarging the longitudinal interior aperture means 14 so that the body of the live bait fish 20 can be easily inserted thereinto, after which the vertical tension can be released from said top and bottom portions 12T and 12B so that they will return to the relative positions shown in solid or full lines in FIG. 3, both at the top and bottom thereof.

The above-mentioned action will cause the inner surfaces of said top and bottom portions 12T and 12B to very firmly grip and engage corresponding exterior surface portions of the middle part of the body of the live bait fish 20 so that it will be positively and firmly held in the manner best shown in FIG. 1.

It should be clearly understood that, in the example illustrated, the application of the above-mentioned vertical tension to said top and bottom portions 12T and 12B of the resilient loop or ring means 12 is best accomplished by manually grasping the upper connection means, indicated generally at 15, and the lower auxiliary connection means, indicated generally at 16, and then applying vertical tension.

On the other hand, since the upper connection means 15 is adapted to be connected to the end of a fishing line, or fishing line leader portion 17, and since the lower auxiliary connection means 16 is adapted to be connected to a fishing sinker, or other fishing accessory item, these may be employed in any desired manner for effectively applying the above-mentioned vertical tension to the top and bottom portions 12T and 12B of the resilient loop or ring means 12 for the forcible effective enlarging action described above.

It should also be noted that the forcible enlarging action described above need not necessarily, in all cases, comprise the application of vertical tension, but may include the application of force in various different ways which will effectively produce enlargement of the interior aperture means 14 in some manner which will facilitate the insertion thereinto of the body of the live bait fish 20.

It should be noted that, in the specific form of the invention illustrated, the inner surfaces of said top and bottom portions 12T and 12B are provided with frictional engagement means for enhancing the frictional engagement thereof with the corresponding exterior surface portions of the body of the live bait fish 20. The locations of said frictional engagement surface means are indicated in FIG. 3 by the reference numeral 18 although, because of the nature of said frictional engagement means, the details thereof cannot be seen in FIG. 3.

However, the details of one exemplary portion of said frictional engagement means 18 is clearly shown in FIG. 4, and, in enlarged fragmentary cross-section, in FIG. 5, where said frictional engagement means takes the form of surface knurling. However, it should be clearly noted that the invention is not specifically limited to knurling, but may employ a variety of different types of frictional engagement means in lieu thereof, as desired.

Also, in certain forms of the invention, the interior surface of the frictional spring means 13 may effectively comprise the desired frictional engagement means adapted for positive engagement with corresponding exterior surface portions of the body of the live bait fish 20.

It should be noted that, while various effective resilient spring means may be employed, the specific type illustrated at 13 takes the form of longitudinal corrugations or flutes integrally formed in the resilient plastic material of which the resilient loop or ring means 12 is molded or extruded. This comprises one particularly effective form of said spring means 13.

The resilient loop or ring means 12 is adapted to be provided with fishing hook means. In the exemplary form of the invention illustrated, said fishing hook means is indicated generally at 19 and comprises a conventional type of fishing hook having a longitudinal shaft 21, which is effectively carried at the bottom of the resilient loop or ring means 12 and substantially parallel therewith so as to extend along the length of, and immediately underneath, the body of the live bait fish 20 for maximum camouflaging effect with respect to said fishing hook means 19.

In the exemplary form illustrated, said shaft 21 of the fishing hook 19 extends rearwardly relative to the body of the live bait fish 20. However, it should be clearly noted that this is not a limitation, and a reversal of this effect can be accomplished by merely inserting the body of the live bait fish 20 through the resilient loop or ring means 12 in the opposite direction.

In the specific form illustrated, the conventional fishing hook 19 may be effectively molded into place with respect to the bottom of the resilient loop or ring means 12. However, it may be mounted relative thereto in any suitable manner and variations in the position thereof are also within the broad scope of the present invention.

While the resilient loop or ring means 12 is illustrated as being made of molded or extruded resilient plastic material, it should be noted that spring metal or various other materials may be employed and may be manufactured by other methods than those outlined above.

Also, it should be noted that the material of which the loop means or ring means 12 is formed may be of a transparent or translucent type and/or may be appropriately colored so as to simulate, in exterior appearance, a corresponding exterior surface portion of the body of the live bait fish 20 whereby to provide for maximum effective camouflaging of the entire device.

It should be noted that the frictional engagement means 18, which is shown as comprising knurling, may take a number of different forms and may include roughened inner surface means, a plurality of apertures, holes, or slots extending through the corresponding parts of the top and bottom portions 12T and 12B and/or projections extending from said apertures, holes, or slots, if desired, or various other equivalent frictional means of a mechanical and/or an adhesive type, or any functional equivalent thereof, may be employed in lieu thereof.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A bait holder comprising: a resilient holding loop means defining a substantially elliptical oval interior aperture means extending longitudinally therethrough and adapted to resiliently engage area coextensive side portions of the middle part of a bait in the form of a longitudinal fish body when inserted longitudinally thereinto with a head portion thereof positioned forwardly of said longitudinal interior aperture means and with a tail portion thereof positioned rearwardly of said longitudinal interior aperture means, said resilient holding loop means having side parts thereof provided with controllably forcibly manually extendable resilient effective spring means in the form of integral corrugation means formed therein whereby to provide for controllable manual extension thereof and the consequent effective enlargement of said longitudinal interior aperture means to facilitate initial insertion of said fish body therethrough, said resilient effective spring means normally forcibly drawing opposed portions of said resilient holding loop means toward each other whereby to correspondingly effectively reduce the interior size of said longitudinal interior aperture means and to produce forcible engagement of the inner surfaces of said opposed portions with corresponding exterior surface portions of the middle part of said fish body adapted to be positioned therein; said inner surfaces of said opposed portions of said resilient loop means being provided with frictional engagement means cooperable for friction engagement with said corresponding exterior surface portions of said middle part of said fish body, said resilient loop means being provided with fish hook means, said resilient holding loop means being integrally provided at the top thereof at a substantially central symmetrical location with respect thereto with connection means adapted for connection with respect to the end of a fishing line.

2. A bait holder as defined in claim 1, wherein said holding loop means is integrally provided at the bottom thereof at a substantially central symmetrical location with respect thereto with auxiliary connection means adapted to be connected with respect to auxiliary fishing accessory means.

3. A bait holder as defined in claim 1, wherein said frictional engagement means comprises inwardly directed knurling carried by said inner surfaces of said opposed portions of said resilient loop means.

4. A bait holder as defined in claim 1, wherein said resilient loop means simulates in appearance a corresponding portion of said fish body.

5. A bait holder as defined in claim 1, wherein said resilient loop means is substantially transparent whereby to present an exterior appearance, when mounted around a middle portion of said fish body, substantially simulating in appearance the corresponding portion of said fish body.

6. A bait holder as defined in claim 1, wherein said fish hook portion is rigidly connected with respect to said resilient loop means at the bottom thereof and has a shaft portion extending rearwardly substantially parallel to and immediately underneath the bottom portion of said resilient loop means.

References Cited by the Examiner

UNITED STATES PATENTS

| 2,476,553 | 7/49 | L'Huillier | 43—44.6 X |
| 2,616,207 | 11/52 | Shadley et al. | 43—41 X |

FOREIGN PATENTS

| 482,271 | 4/52 | Canada. |
| 20,753 | 4/06 | Sweden. |

ABRAHAM G. STONE, *Primary Examiner*.